United States Patent [19]
Merkovsky

[11] Patent Number: 4,839,135
[45] Date of Patent: Jun. 13, 1989

[54] ANTI-VIBRATION FLUX THIMBLE

[75] Inventor: Daniel Merkovsky, Monroeville, Pa.

[73] Assignee: Westinghouse Electric Corp., Pittsburgh, Pa.

[21] Appl. No.: 87,941

[22] Filed: Aug. 21, 1987

[51] Int. Cl.$^4$ .............................................. G21C 21/00
[52] U.S. Cl. .................................... 376/254; 376/260
[58] Field of Search .............. 376/245, 254, 255, 260, 376/291, 292, 463; 138/147; 403/109, 377

[56] References Cited

U.S. PATENT DOCUMENTS

| | | |
|---|---|---|
| 3,400,289 | 9/1968 | Andersson . |
| 3,751,333 | 8/1973 | Drummond et al. . |
| 3,858,191 | 12/1974 | Neuner et al. . |
| 3,893,651 | 7/1975 | Uecker . |
| 3,932,211 | 1/1976 | Loving, Jr. . |
| 4,255,234 | 3/1981 | Neuner et al. . |
| 4,708,844 | 11/1987 | Kearton et al. .................. 376/252 |
| 4,716,004 | 12/1987 | Merkovsky et al. . |

FOREIGN PATENT DOCUMENTS

| | | |
|---|---|---|
| 0229703 | 7/1987 | European Pat. Off. . |
| 2592517 | 7/1987 | France . |
| 1293109 | 10/1972 | United Kingdom . |
| 1604086 | 12/1981 | United Kingdom . |
| 2156143 | 10/1985 | United Kingdom . |

Primary Examiner—Deborah L. Kyle
Assistant Examiner—Richard W. Wendtland
Attorney, Agent, or Firm—M. G. Panian

[57] ABSTRACT

A thimble which resists vibrations caused by turbulence in the coolant flow of a nuclear reactor includes a portion of preselected length with an increased outside diameter. The conventionally-sized thimble is sheathed with a tubing adapted for insertion within the reactor, the tubing at a leading end thereof being fixed to the conventionally-sized thimble and at a trailing end thereof being slidingly coupled to the conventionally-sized thimble. A bullet shaped member seals the leading end and facilitates its insertion.

25 Claims, 3 Drawing Sheets

ANTI-VIBRATION FLUX THIMBLE

BACKGROUND OF THE INVENTION

This invention relates generally to the detection of neutron flux in a nuclear power plant, and more particularly to an improved flux thimble.

A typical pressurized water reactor nuclear power plant includes a reactor vessel which contains nuclear fuel, a coolant (water) which is heated by the nuclear fuel, and means for monitoring and controlling the nuclear reaction. The reactor vessel is typically of a cylindrical configuration, provided with a hemispherical bottom and a hemispherical top which is removable. Hot water is conveyed from and returned to the vessel by a reactor coolant system which includes one or more reactor coolant loops, usually three or four loops, depending upon the power-generating capacity of the reactor. Each loop includes a pipeline to convey hot water from the reactor vessel to a steam generator, a pipeline to convey the water from the steam generator back to the reactor vessel, and a pump. The steam generator is essentially a heat exchanger which transfers heat from the reactor coolant system to water from a source that is isolated from the reactor coolant system, with the resulting steam being conveyed to a turbine to generate electricity. During operation of the reactor, the water within the vessel and the coolant system is maintained at a high pressure to keep it from boiling as it is heated by the nuclear fuel.

Nuclear fuel is supplied to the reactor in the form of a number of fuel assemblies. Each fuel assembly conventionally includes a base element called a bottom nozzle and a bundle of fuel rods and tubular guides which are supported on the bottom nozzle. The fuel rods have cylindrical housings which are filled with pellets of fissionable material enriched with an isotope of uranium, typically U235. The tubular guides accommodate measuring instruments and movably mounted control rods of neutron-moderating material. A typical fuel assembly for a pressurized water reactor is about 4.1 meters long, about 19.7 centimeters wide, and has a mass of about 585 kilograms, 196 such fuel assemblies being supported parallel to one another on a core plate within the reactor vessel of a typical four loop reactor. After a service life during which the U-235 enrichment of the fuel assemblies is depleted, the reactor is shut down, the pressure within the vessel is relieved, the hemispherical upper cap of the vessel is removed, and the old fuel assemblies are replaced by new ones.

A number of measuring instruments are employed to promote safety and to permit proper control of the nuclear reaction. Among other measurements, a neutron flux map is generated periodically, such as every 28 days, using data gathered by neutron flux detectors which are moved through a number of selected fuel assemblies located across the core. In order to guide the flux detectors within the fuel assemblies, closed stainless steel tubes known as flux thimbles extend through the bottom of the reactor vessel and into the fuel assemblies which have been selected as measuring sites. While the details of the detectors and their respective drive units are not illustrated herein, the operation of the detectors and the operation and processing of information are described and illustrated in U.S. Pat. No. 3,858,191, while details of the methods employed to monitor neutron flux in a nuclear reactor are described in U.S. Pat. Nos. 3,932,211, and 4,255,234, each of which is assigned to the assignee of the present invention, and is incorporated herein by reference.

Conventional flux thimbles have several shortcomings. A considerable amount of turbulence exists during operation of a reactor in regions to which the flux thimbles are exposed. Such turbulence vibrates the flux thimbles and causes wear to an undesirable extent. Simply increasing the size of the flux thimble would reduce the vibrations caused by such turbulence, but would also further complicate matters. The inside diameter of conventional flux thimbles must be manufactured to a very high standard of quality for surface finish, much higher than commercial grade tubing, since the interior portion of the flux thimble must permit rapid and accurate placement of the detector therein. Therefore, if the inside diameter of a flux thimble is maintained to promote movement of the detectors therein while the outside diameter is increased in order to reduce vibrations caused by turbulence within the reactor, the thickness of the flux thimble wall is increased thereby making the flux thimble stiffer and more likely to cause difficulty with insertion and retraction thereof into the reactor, operations that must take place at each refueling. In addition to the increase in stiffness caused by a flux thimble having a large outside diameter, the reduced annular gap between the larger flux thimble and its associated guide tubing will cause an increase in the number of contact surfaces therebetween resulting in higher friction, and again increased difficulty in the insertion and retraction of the flux thimble before and after refueling. Likewise, if both the outside and inside diameters of a flux thimble are increased to reduce vibration caused by turbulence in the reactor as well as to prevent an increase in stiffness, the increased inside diameter will provide additional clearance between the interior walls of the flux thimble and its associated detector which may result in problems of flux detector drive cable buckling or kinking as the detector is pushed into the thimble. It would, therefore, be desirable to provide a flux thimble which minimizes the potential for vibrations caused by turbulence in the reactor, while at the same time facilitates the insertion and retraction of the flux thimble and detector contained therein.

Another aspect which must be considered once an acceptably sized flux thimble is determined is the problems associated with the manufacture of such a flux thimble. Because of their critical nature, flux thimbles must be drawn in a continuous length from a billet of steel, the length of conventional flux thimbles often exceeding 120 feet. While the outside diameter need not be manufactured to the same high quality standards for surface finish as the inside diameter of conventional flux thimbles, the effort to develop a new flux thimble size becomes quite expensive and requires long lead times since retooling is required. It would, therefore, be desirable to adapt conventional flux thimbles by increasing their size only in the vicinity to which they may be exposed to vibration causing turbulence.

SUMMARY OF THE INVENTION

Accordingly, it is a general object of the present invention to provide an improved flux thimble for a reactor vessel in a nuclear power plant. More specifically, it is an object of the present invention to provide a flux thimble which minimizes vibrations caused by turbulence existing during operation of the reactor.

Another object of the present invention is to provide a method and apparatus for modifying conventional flux thimbles in order to minimize vibration caused by turbulence existing during operation of the reactor.

Still another object of the present invention is to provide an improved flux thimble which is easy to manufacture, requiring no special tooling.

A further object of the present invention is to provide a flux thimble which facilitates insertion and retraction thereof before and after refueling of the reactor.

A still further object of the present invention is to provide a flux thimble which minimizes problems of buckling or kinking of the drive cable moving the flux detector therethrough.

Briefly these and other objects of the present invention are achieved by providing a thimble for accommodating a movable in-core detector used to monitor power distribution in a nuclear reactor having a vessel including a wall, a sleeve penetrating the wall, a core plate supporting a fuel assembly, a bore formed in the core plate, and a bottom mounted instrumentation column communicating with the bore, the bottom mounted instrumentation column being coupled to the core plate and extending therefrom to the vessel penetration sleeve, the thimble comprising first tubular means for slidably guiding the detector within the nuclear reactor, the first tubular means being linearly movable through the bore in the core plate and into the fuel assembly; second tubular means for sheathing the first tubular means along a predetermined length thereof; and attachment means for attaching the second tubular means to the first tubular means at an attachment region having a length that is substantially less than the length of the second tubular means, so that the second tubular means is not immobilized with respect to the first tubular means except at the attachment region.

In order to minimize vibrations caused by turbulence existing during operation of the reactor, the first tubular means includes an inside diameter adapted for driving the detector therein and a first predetermined outside diameter. The second tubular means comprises tubing with a second predetermined outside diameter selected to slidingly fit within the bore. A bullet-shaped member including first and second shoulder portions which are adapted to seal the second and first tubular means respectively is inserted therein and coupled thereto by means such as snap rings. The trailing end of the second tubular means is permitted to slidingly engage the first tubular means in order to permit flexibility thereof during insertion and retraction of the flux thimble within the reactor, by means such as a locally-reduced portion of the second tubular means at its trailing end, or a bushing connected to the second tubular means, which is adapted to be in close contact with the first tubular means in order to effectively seal it.

The above and other objects, advantages, and novel features of the present invention will become more apparent from the following detailed description of the invention when considered in conjunction with the accompanying drawings wherein:

DETAILED DESCRIPTION OF THE INVENTION

Figure 1:
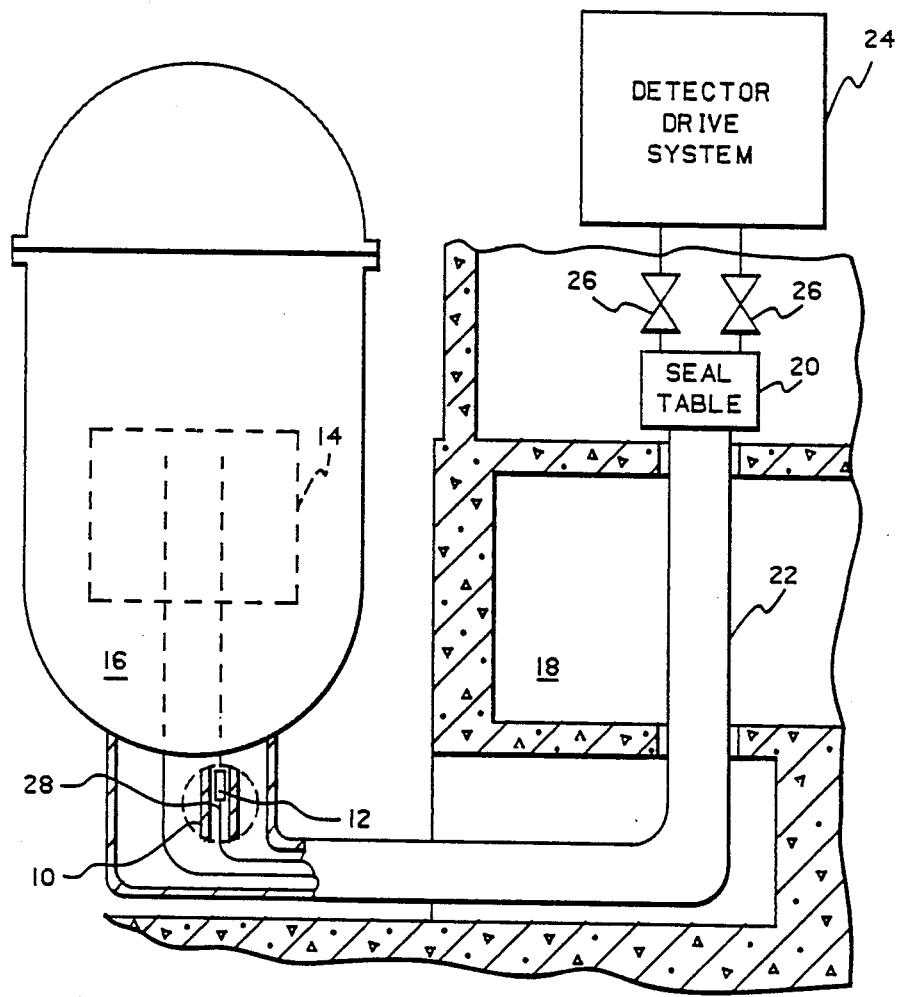
FIG. 1 is a diagrammatic illustration of a conventional flux mapping system which may incorporate the improved flux thimble of the present invention.

Referring now to the drawings, wherein like characters designate like or corresponding parts throughout the several views, there is shown in FIG. 1 a conventional system for the insertion of movable miniature detectors which are used to provide partial or full core maps for the determination and verification of core power distributions occurring during normal reactor operation, or abnormal power distributions resulting from misplaced rods or other anomalies. Power distribution is determined by measuring the neutron flux at different positions. Retractable thimbles 10, into which the miniature detectors 12 are driven, take the routes approximately as shown. The thimbles 10 are inserted into the reactor core 14 through conduits 22 (only one of which is illustrated in FIG. 1) extending from the bottom of the reactor vessel 16 through the concrete shield area 18 and then up to a thimble seal table 20. Since the movable detector thimbles 10 are closed at the leading (i.e., reactor) end, they are dry inside. The thimbles 10 thus serve as a pressure barrier between the reactor water pressure (e.g., 2500 psig design) and the atmosphere. Mechanical seals between the retractable thimbles 10 and the conduits are provided at the seal table 20. As a result, the conduits 22 are essentially extensions of the reactor vessel 16, with the thimbles 10 allowing the insertion of the in-core instrumentation movable miniature detectors 12. During operation, the thimbles 10 are stationary and will be retracted only under depressurized conditions during refueling or maintenance operations. Withdrawal of a thimble 10 to the bottom of the reactor vessel 16 is also possible if work is required on the vessel internals.

The drive system 24 for insertion of the miniature detectors 12 conventionally includes a plurality of drive units, limit switch assemblies, 5- and 10-path rotary transfer devices, and isolation valves 26 as shown. Each drive unit pushes a hollow helical-wrap drive cable 28 into the core 14 with a miniature detector 12 attached to the leading end of the cable 28 and a small diameter coaxial cable (not illustrated), which communicates the detector output, threaded through the hollow center back to the trailing end of the drive cable 28.

Typical requirements of a neutron flux mapping system consist of multiple full core maps in conjunction with the core start up physics measurements (normally 25 maps over a six week period), and monthly full core maps thereafter. In addition, partial or full core maps (equivalent to about 150 detector insertions per year) are made in support of various research and development work. Such utilization of the system represents an average of about 500 cycle insertions for each detector during the first year of plant operation.

Figure 2:
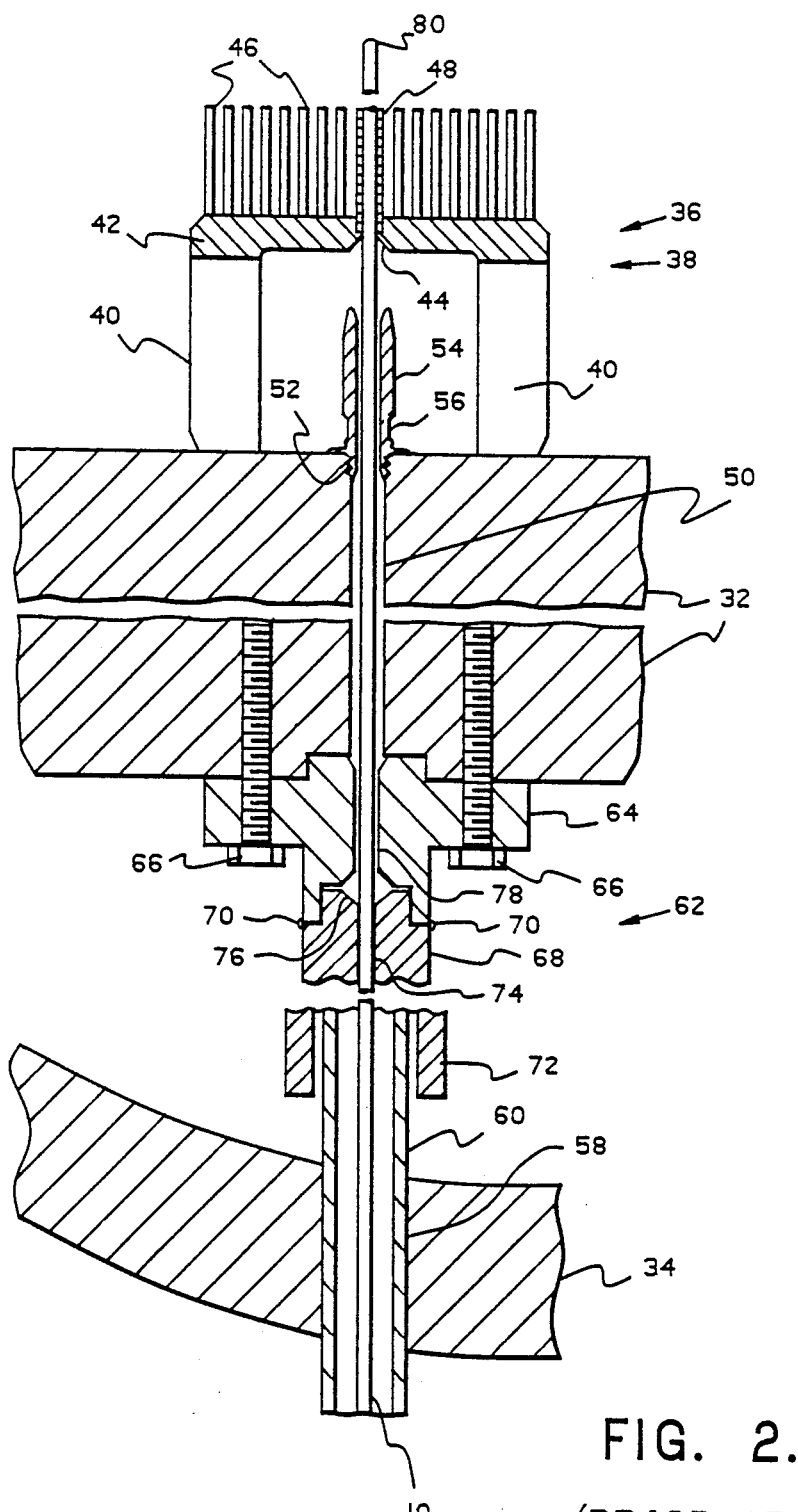
FIG. 2 is a sectional view generally illustrating features within the reactor vessel of FIG. 1, including a core plate, a fuel assembly supported by the core plate, and the flux thimble according to the present invention.

As shown in FIG. 2, a core plate 32 is horizontally mounted within the reactor vessel 16 having a wall 34, the portion of the wall 34 which is illustrated being at the hemispherical bottom end cap of the reactor vessel 16. A number of fuel assemblies, including fuel assemblies 36, are supported in an orderly array on the core plate 32. Fuel assembly 36 includes a bottom nozzle 38 having four legs 40 which are joined to a platform portion 42 with a centrally disposed aperture 44 in it. For purposes of the present application, the aperture 44 will be deemed to be located in the plane of the lower surface of the platform portion 42. A number of fuel rods 46 are bundled together and supported on the platform portion 42. Within this bundle is an instrumentation tube 48 which is aligned with the aperture 44 and which extends to the top nozzle (not shown) of the fuel assembly 36.

A bore 50 having a threaded region 52 typically extends through the core plate 32 in alignment with the aperture 44. A conventional thimble guide 54 is provided with a threaded portion and with a recessed wrench-engaging portion 56 which permits technicians to screw the thimble guide 54 into the threaded region 52 of the core plate 32 during fabrication of the reactor. After the thimble guide 54 is attached in such manner, welds may be added for additional security. It should be noted at this juncture, however, that thimble guide 54 is present only in some existing reactor designs. In such reactors not having a thimble guide 54, a smooth bore of a correspondingly-sized inside diameter is provided.

Another bore 58 extends through the wall 34 of the reactor vessel 16 in alignment with the bore 50. A vessel penetration sleeve 60 having an outer diameter typically of about 1.5 inches (3.81 centimeters) extends through the bore 58 and is also welded to provide a seal which is resistant to high pressure. A bottom-mounted instrumentation column 62 mounted on the core plate 32 extends between the bore 50 and the vessel-penetration sleeve 60. Bottom mounted instrumentation column 62 typically includes a fitting 64 which is attached to the core plate 32 by bolts 66, an upper pipe element 68 which is joined to the fitting 64 by welds 70, and a lower pipe element 72 which is joined coaxially to the upper pipe element 68 at a tie plate (not shown). The lower pipe element 72 typically has an inner diameter of 2 inches (5.08 centimeters), so that there is a gap between the vessel penetration sleeve 60 and the lower pipe element 52.

In a typical four-loop pressurized water reactor (having 196 fuel assemblies 36), 58 of the fuel assemblies 36 would be selected for neutron flux monitoring. Accordingly, in such a reactor it will be apparent that there would be a corresponding number of thimble guides 54, each communicating via a respective bore 50 and bottom mounted instrumentation columns 62 with a respective vessel-penetration sleeve 60. During fabrication, the vessel penetration sleeves 60 would be installed in the wall 34 of the reactor vessel 16, while the bottom mounted instrumentation columns 62 would be installed on the core plate 32, the bottom mounted instrumentation columns 62 being secured to one another by tie plates (not shown). Thereafter, the core plate 32 and attached structures would be lowered into the reactor vessel 16, with the vessel penetration sleeves 60 fitting into their respective lower pipe elements 72. In the resulting structure, the upper ends of the vessel penetration sleeves 60 would be spaced apart from the lower ends of the upper pipe elements 68, so that the vessel penetration sleeves 60 would not be in fluid-tight communication with their respective bottom mounted instrumentation columns.

The bore 74 of upper pipe element 68 in one typical configuration has a diameter of 0.468 inches (1.189 centimeters) and terminates in flared region 76. On the other hand, the bore 78 of fitting 64 is typically 0.68 inches (1.73 centimeters) in diameter and has flared regions at either end. The bore 50 by comparison typically has a diameter of 0.75 inches (1.91 centimeters). It is, therefore, apparent that the channel provided by bores 74, 78 and 50 becomes progressively wider from the upper pipe element 68, to fitting 64, to the bore 50. Such construction facilitates manufacture of the reactor and provides guidance for the thimble 10 while avoiding the possibility that the thimble 10 might become stuck in the channel.

Thimble 10 is conventionally along stainless steel tube which begins at the seal table 20 (FIG. 1) outside the reactor vessel 16, and which includes a closed end 80 (FIG. 2) that is normally disposed inside a fuel assembly 36. As a result, the thimble 10 slidably extends through the instrumentation tube 48, thimble guide 54, bore 50, bottom mounted instrumentation column 62, and vessel penetration sleeve 60. A stainless steel guide tube comprising the conduit 22 shown in FIG. 1 is welded to vessel 16 around the outer ends of the vessel penetration sleeve 60, such that the thimble 10 extends within the conduit 22 to the seal table 20, which is typically located in a shielded position near the top of the reactor vessel 16 as shown in FIG. 1. Since the interior of the reactor vessel 16 is in fluid communication with the interior of the vessel penetration sleeve 60, it will be apparent that the conduit 22 provides a pressure boundary which extends around the thimble 10 from the wall 34 of the reactor vessel 16 to the seal table 20, where a high pressure seal is provided between the inner wall of the conduit 22 and the outer wall of the thimble 10. The net result is that the thimble 10 provides a low pressure access channel into the reactor vessel 16 from a shielded position outside of the reactor vessel 16.

As discussed herein above, the conventional arrangement as shown by FIG. 2 has several shortcomings. It has been found that considerable turbulence exists during operation of a nuclear reactor in the region between the upper surface of the core plate 32 and the lower surfaces of platform portions 42 of the fuel assemblies 36. This configuration exposes a significant portion of the thimbles 10 to this turbulence which may, depending on dimensional tolerances, vibrate the thimbles 10 and increase their wear to an undesirable extent. Simply increasing the length of the guides 54 where they exist would be undesirable because fuel assembly designs may change, including the lengths of the legs 40. Where they exist, guides 54 are permanently installed at the time the reactor vessel 16 is built; therefore any particular length for the guides 54 that is selected at that time might make it impossible to take advantage of future design improvements in fuel assemblies. Even apart from this consideration, it would be undesirable to make solid guides 54 long enough to touch the bottom nozzles 17 of a particular fuel assembly deisgn because very slight dimensional inaccuracies might upset the footing of the legs 40 and leave the fuel assemblies in an unbalanced condition on top of one or more of the guides 54. Furthermore, it has been found that fluid flow in the gap around a conventional thimble 10 due to the progressively widening channel from element 68 to fitting 64 to bore 50 may be sufficient to cause vibrations which increase wear. Copending U.S. patent application Ser. No. 817,703 filed Jan. 10, 1986, and Ser. No. 826,522 filed Feb. 6, 1986, each of which is assigned to the assignee of the present invention and is incorporated herein by reference, suggest various modifications to the conventional thimble guide 54, but entail modifications within the internals of the reactor vessel 16. It would, therefore, be desirable to provide an improved flux thimble which is easy to fabricate and install, and which minimizes vibrations caused by turbulence in the region between the upper surface of the core plate 32 and the lower surfaces of platform portions 42 of the fuel assemblies 36.

In accordance with the present invention, vibration is reduced by providing a sheath to increase the outside diameter of a conventional flux thimble 10 at least at that portion beneath bottom nozzle 38 which is exposed to turbulent coolant flow during reactor operation. Preferably the region of increased diameter extends all the way from the top end of the thimble 10, when it is fully inserted into a fuel assembly 36, to the outer end of vessel penetration sleeve 60. That is, the region of increased diameter is preferably longer than the greatest distance by which thimble 10 may be inserted into reactor vessel 16, thereby avoiding a discontinuity (where the increased diameter is discontinued) which might otherwise result in a snag within vessel 16. This length varies from thimble to thimble depending upon the relative location of a thimble within the core, due to the hemispherical shape of the bottom wall 34 of the reactor vessel 16, and from reactor to reactor depending upon the size of the reactor vessel 16 and its internals configuration.

Figure 3:
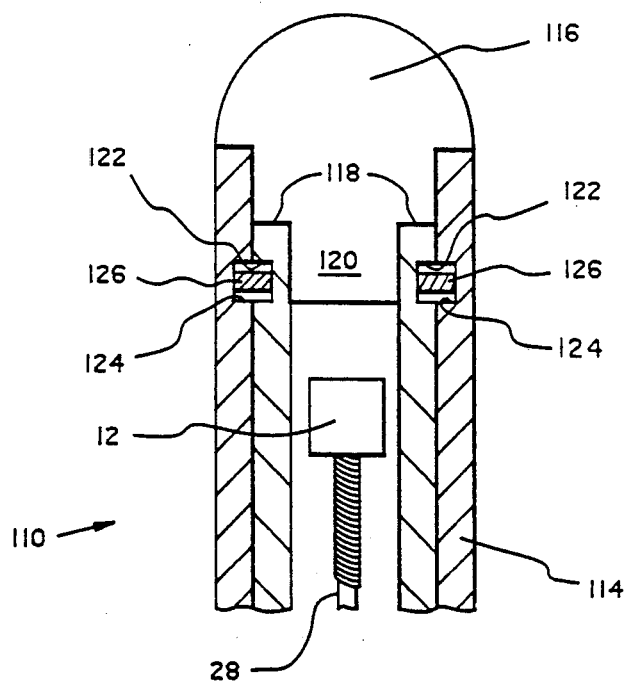
FIG. 3 is a detailed illustration in sectional view of the flux thimble according to the present invention.
Figure 3:
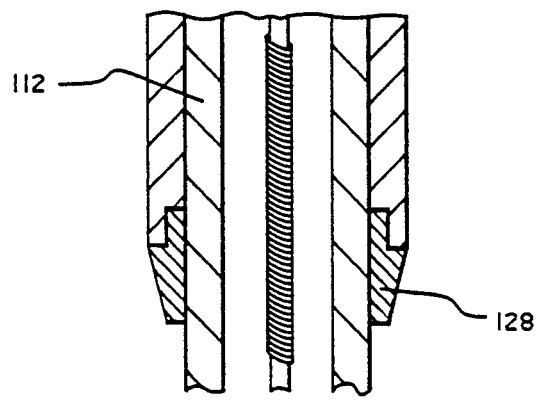

Referring to FIG. 3, it can be seen that an improved flux thimble 110 according to the present invention consists generally of a first tubular means 112, comprising the conventional stainless steel tubing used to house a miniature detector 12, and second tubular means 114 for sheathing the first tubular means 112 along the length thereof corresponding to the distance between the upper end of first tubular means 112 when it is fully inserted and the lower end of vessel penetration sleeve 60. Since this length rarely exceeds 20 feet, standard lengths of stainless steel tubing may be utilized to produce the second tubular means 114, thereby obviating the necessity for manufacturing specialized lengths of tubing having a critically formed inside diameter whichis adapted for reliable movement of the detectors 12 within the flux thimble.

The closed upper end 80 (see FIG. 2) of the conventional thimble is first cut off. In order to provide a pressure boundary for the detector 12 contained within the thimble 110, a bullet-shaped member 116 having a first shoulder portion 118 is used to seal the second tubular means 114, and a second shoulder 120 is used to seal the first tubular means 112 comprising the stainless steel tubuing used for a conventional flux thimble. As a result, the bullet shaped member 116 comprises a closing means which rigidly fixes the leading ends of the first and second tubular means 112 and 114 one to the other. The bullet shaped member 116 is preferably fixed to the first and second tubular means 112 and 114 by welding the first and second shoulder portions 118 and 120 thereto. Such welding can be accomplished by sliding second tubular means 114 downward from thetop of the first tubular means 112 so that first tubular means 112 can be welded to shoulder portion 120, and then raising second tubular means 114 so that it can be welded to shoulder portion 118. In the alternative, the closed upper end 80 of the conventional thimble is left on and a pair of annular grooves 122 and 124 are formed respectively in the outside diameter of the first tubular means 112 and the inside diameter of the second tubular means 114 such that a conventional snap ring 126, or similar such suitable means may be placed within the grooves 122 and 124 in order to rigidly fix the first and second tubular members 112 and 114 one to the other. Another altnerative is provided by using both bullet shaped member 116 and snap ring 126 as illustrated in FIG. 3.

Since the region of fixed attachment of second tubular means 114 to first tubular means 112 exists only at the top of thimble 110, second tubular means 114 is not immobilized with respect to first tubular means 112 along the rest of its length and thus does not unduly stiffen the structure. That is, the composite formed by tubular means 112 and 114 is considerably more limber than it would be if the region of fixed attachment extended for the entire length of second tubular means 114.

The trailing end of the second tubular means or sheath tube 114 is slidingly coupled to the first tubular means 112 by means of either locally reducing a portion of the second tubular means 114 at its trailing end, such that the locally reduced portion is adapted to be in close contact with the first tubular means 112, or by attaching a bushing 128 to the second tubular means 114 as shown in FIG. 3. The bushing 128 may conveniently be inserted between the first and second tubular means 112 and 114, and welded or otherwise rigidly attached to the sheath tube 114. In such a manner, the assembled flux thimble 110 provides the requisite stiffness within the region thereof exposed to turbulence caused by reactor coolant flow, yet also provides adequate flexibility to permit easy insertion and retraction of the flux thimble 110 within the internals of the reactor vessel 16.

A method of minimizing vibrations experienced in a conventional flux thimble 10, according to yet another aspect of the present invention, comprises the selection of a predetermined length of a conventional flux thimble 10 over which it is exposed to turbulence caused by reactor coolant flow during operation of the reactor. Thereafter, the outside diameter of the flux thimble 10 is increased in the region of such selected length by sheathing the first tubular means comprising the flux thimble 10 with a second tubular means having an inside diameter corresponding generally to the outside diameter of the first tubular means. The leading (or reactor) end of both first and second tubular means are then closed by a bullet shaped member which is attached to the first and second tubular means in order to fix them relative to one another. On the other hand, the trailing end of the second tubular means is permitted to be slidingly coupled to the first tubular means, such as by a bushing inserted therebetween and attached to the second tubular means.

Obviously, many modifications are possible in light of the above teachings. It should, therefore, be understood that the present invention as defined by the appended claims may be practiced otherwise than as specifically described herein without departing from the true spirit or scope thereof.

I claim:

1. A thimble for accommodating a movable in-core detector used to monitor power distribution in a nuclear reactor having a vessel including a wall, a sleeve penetrating the wall, a core plate supporting a fuel assembly, a bore formed in the core plate, and a bottom-mounted instrumentation column communicating with the bore, the bottom mounted instrumentation column being coupled to the core plate and extending therefrom to the vessel penetration sleeve, the thimble comprising:

first tubular means for slidably guiding the detector within the nuclear reactor, said first tubular means being linearly movable through the bore in the core plate and into the fuel assembly;

second tubular means for sheathing said first tubular means along a predetermined length thereof; and a bullet-shaped member for attaching said second tubular means to said first tubular means at an attachment region having a length that is substantially less than the length of said second tubular means, so that said second tubular means is not immobilized with respect to said first tubular means except at said attachment region.

2. The thimble according to claim 1, wherein said first tubular means comprises stainless steel tubing with a 0.210 inch inside diameter and a 0.313 inch outside diameter.

3. The thimble according to claim 1, wherein said second tubular means comprises tubing with an outside diameter selected to slidingly fit within the bore.

4. The thimble according to claim 1, wherein said bullet-shaped member includes a first shoulder portion adapted to seal said second tubular means and a second shoulder portion adapted to seal said first tubular means.

5. The thimble according to claim 4, wherein said first shoulder portion is welded to said second tubular means and said second shoulder portion is welded to said first tubular means.

6. The thimble according to claim 1, wherein said first tubular means has a leading end, wherein said second tubular means has leading and trailing ends, said leading end of said second tubular means being positioned adjacent said leading end of said first tubular means, and further comprising means for slidably coupling said second tubular means at the trailing end thereof to said first tubular means.

7. The thimble according to claim 6, wherein said means for coupling comprises a bushing welded to said second tubular means.

8. The thimble according to claim 6, wherein said means for coupling comprises a locally-reduced portion of said second tubular means at its trailing end, said locally-reduced portion adapted to be in close contact with said first tubular means.

9. A method of fabricating a thimble used to accommodate a movable in-core detector for monitoring power distribution in a nuclear reactor having a vessel including a wall, a sleeve penetrating the wall, a core plate supporting a fuel assembly, bore formed in the core plate, and a bottom-mounted instrumentation column communicating with the bore, the bottom mounted instrumentation column being coupled to the core plate and extending therefrom to the vessel penetration sleeve, said method comprising the steps of:

forming first tubular means for slidably guiding the detector within the nuclear reactor, said first tubular means being linearly movable through the bore in the core plate and into the fuel assembly;

sheathing said first tubular means with a second tubular means along a predetermined length thereof; and fixedly attaching said second tubular means to said first tubular means at an attachment region having a length that is substantially less than the length of said second tubular means, so that said second tubular means is not immobilized with respect to said first tubular means except at said attachment region, said attaching step further comprising the step of forming a bullet-shaped member having a greatest diameter substantially equal to the outside diameter of said second tubular means, having a first shoulder portion adapted to seal said second tubular means, and having a second shoulder portion adapted to seal said first tubular means.

10. The method according to claim 9, wherein said attaching step further comprises welding said first and second shoulder portions respective to said second and first tubular means.

11. The method of claim 9, wherein said first tubular means has a leading end, wherein said second tubular means has leading and trailing ends, said leading end of said second tubular means being positioned adjacent said leading end of said first tubular means, and further comprising the step of slidably coupling said second tubular means at said trailing end thereof to said first tubular means.

12. The method according to claim 11, wherein said slidably coupling step comprises attaching a bushing to said trailing end, said bushing at said trailing end being bevelled to conform substantially with said first tubular means.

13. The method according to claim 11, wherein said slidably coupling step comprises locally reducing said trailing end to conform substantially with said first tubular means.

14. A thimble for accommodating a movable in-core detector used to monitor power distribution in a nuclear reactor having a vessel including a wall, a sleeve penetrating the wall, a core plate supporting a fuel assembly, a bore formed in the core plate, and a bottom mounted instrumentation column communicating with the bore, the bottom mounted instrumentation column being coupled to the core plate and extending therefrom to the vessel penetration sleeve, said thimble comprising:

first tubular means for slidably guiding the detector within the nuclear reactor, the first tubular means being linearly movable though the bore in the core plate and into the fuel assembly;

second tubular means for sheathing said first tubular means along a predetermined length thereof;

a bullet shaped ember having first and second shoulder portions, said first shoulder portion being attached to said second tubular means and said second shoulder portion being attached to said first and second tubular means one to the other at leading ends thereof; and means for slidingly coupling said second tubular means at a trailing end thereof to said first tubular means.

15. The thimble according to claim 14, further comprising snap ring means for fixing the leading ends of said first and second tubular means.

16. A thimble for accommodating a movable in-core detector used to monitor power distribution in a nuclear reactor having a vessel including a wall, a sleeve penetrating the wall, a core plate supporting a fuel assembly, a bore formed in the core plate, and bottom-mounted instrumentation column communicating with the bore, the bottom mounted instrumentation column being coupled to the core plate and extending therefrom to the vessel penetration sleeve, the thimble comprising:

first tubular means for slidably guiding the detector within the nuclear reactor, said first tubular means being linearly movable through the bore in the core plate and into the fuel assembly;

second tubular means for sheathing said first tubular means along a predetermined length thereof; and said first and second tubular means each having an annular groove formed respectively about their outside and inside diameters, and a snap ring within said annular grooves for attaching said second tubular means to said first tubular means at an attachment region having a length that is substantially less than the length of said second tubular means, so that said second tubular means is not immobilized with respect to said first tubular means except at said attachment region.

17. The thimble according to claim 16, wherein said first tubular means comprises stainless steel tubing with a 0.210 inch inside diameter and a 0.313 inch outside diameter.

18. The thimble according to claim 16, wherein said second tubular means comprises tubing with an outside diameter selected to slidingly fit within the bore.

19. The thimble according to claim 16, wherein said first tubular means has a leading end, wherein said second tubular means has leading and trailing ends, said leading end of said second tubular means being positioned adjacent said leading end of said first tubular means, and further comprising means for slidably coupling said second tubular means at the trailing end thereof to aid first tubular means.

20. The thimble according to claim 19, wherein said means for coupling comprises a bushing welded to said second tubular means.

21. The thimble according to claim 19, wherein said means for coupling comprises a locally-reduced portion of said second tubular means at its trailing end, said locally-reduced portion adapted to be in close contact with said first tubular means.

22. A method of fabricating a thimble used to accommodate a movable in-core detector for monitoring power distribution in a nuclear reactor having a vessel including a wall, a sleeve penetrating the wall, a core plate supporting a fuel assembly, bore formed in the core plate, and a bottom-mounted instrumentation column communicating with the bore, the bottom mounted instrumentation column being coupled to the core plate and extending therefrom to the vessel penetration sleeve, said method comprising the steps of:

forming first tubular means for slidably guiding the detector within the nuclear reactor, said first tubular means being linearly movable through the bore in the core plate and into the fuel assembly;

sheathing said first tubular means with a second tubular means along a predetermined length thereof; and fixedly attaching said second tubular means to said first tubular means at an attachment region having a length that is substantially less than the length of said second tubular means, so that said second tubular means is not immobilized with respect to said first tubular means except at said attachment region, said attaching step comprising the steps of:

forming a first annular groove about the outside diameter of the first tubular means;

forming a second annular groove about the inside diameter of said second tubular means;

inserting a snap ring within said first annular groove; and sliding said second tubular means over said first tubular means to engage said snap ring within said second annular groove.

23. The method of claim 22, wherein said first tubular means has a leading end, wherein said second tubular means has leaading and trailing ends, said leading end of said second tubular means being positioned adjacent said leading end of said first tubular means, and further comprising the step of slidably coupling said second tubular means at said trailing end thereof to said first tubular means.

24. The method according to claim 23, wherein said slidably coupling step comprises attaching a bushing to said trailing end, said bushing at said trailing end being bevelled to conform substantially with said first tubular means.

25. The method according to claim 23, wherein said slidably coupling step comprises locally reducing said trailing end to conform substantially with said first tubular means.

* * * * *